United States Patent
Humphrey et al.

(10) Patent No.: US 12,259,246 B1
(45) Date of Patent: Mar. 25, 2025

(54) METHOD, APPARATUS, AND COMPUTER READABLE MEDIUM FOR CALCULATING A HANDRAIL INFLUENCE INTENSITY FACTOR

(71) Applicant: MSRS LLC, Granby, CT (US)

(72) Inventors: Andrew Humphrey, Deale, MD (US); Joshua Burton, Gilbert, AZ (US)

(73) Assignee: MSRS LLC, Granby, CT (US)

( * ) Notice: Subject to any disclaimer, the term of this patent is extended or adjusted under 35 U.S.C. 154(b) by 0 days.

(21) Appl. No.: 18/662,068

(22) Filed: May 13, 2024

(51) Int. Cl.
| | |
|---|---|
| G01C 21/00 | (2006.01) |
| G01C 21/30 | (2006.01) |
| G01S 19/01 | (2010.01) |
| G01S 19/47 | (2010.01) |

(52) U.S. Cl.
CPC .............. *G01C 21/30* (2013.01); *G01S 19/01* (2013.01); *G01S 19/47* (2013.01)

(58) Field of Classification Search
CPC ......... G01C 21/30; G01C 21/00; G01S 19/01; G01S 19/47
USPC ......................................................... 701/446
See application file for complete search history.

(56) References Cited

U.S. PATENT DOCUMENTS

| | | |
|---|---|---|
| 6,792,353 B2 | 9/2004 | Lin |
| 7,095,336 B2 | 8/2006 | Rodgers et al. |
| 7,302,340 B2 | 11/2007 | Preston |
| 7,425,902 B2 | 9/2008 | Fedora et al. |
| 7,437,062 B2 | 10/2008 | Holcomb |
| 7,490,008 B2 | 2/2009 | Draganov |
| 7,505,364 B2 | 3/2009 | Polvani |
| 7,584,048 B2 | 9/2009 | Pham et al. |
| 7,756,639 B2 | 7/2010 | Colley et al. |
| 7,835,863 B2 | 11/2010 | Lokshin et al. |
| 7,839,329 B2 | 11/2010 | Mao |
| 7,852,462 B2 | 12/2010 | Breed et al. |
| 7,856,336 B2 | 12/2010 | Van Wyck Loomis |
| 7,868,821 B2 | 1/2011 | Hoshizaki |
| 7,962,285 B2 | 6/2011 | Breed |
| 8,041,503 B2 | 10/2011 | Choi et al. |
| 8,159,393 B2 | 4/2012 | Xie et al. |

(Continued)

OTHER PUBLICATIONS

International Search Report and Written Opinion in PCT/US2022/048529, Jan. 13, 2023, 7 pages.

(Continued)

*Primary Examiner* — Shardul D Patel
(74) *Attorney, Agent, or Firm* — Gerard M. Donovan; Reed Smith LLP (57) ABSTRACT

A method for dynamically computing a handrail influence intensity factor includes the steps of identifying a current location of a vehicle, retrieving map data of an area corresponding to the current location of the vehicle, identifying a current road of the vehicle based on the map data and the current location of the vehicle, determining at least one of one or more roads that intersect the current road and one or more roads closest to the current road, retrieving a vehicle heading for the vehicle, determining a set of candidate roads, determining a relative target heading for each candidate road in the set of candidate roads, calculating a handrail influence intensity factor based on a distance between the current location of the vehicle and a closest point on each candidate road and based on a difference between the vehicle heading and the relative target heading for each candidate road.

20 Claims, 6 Drawing Sheets

(56) References Cited

U.S. PATENT DOCUMENTS

| | | |
|---|---|---|
| 8,200,423 B2 | 6/2012 | Dietsch et al. |
| 8,275,544 B1 | 9/2012 | Wells et al. |
| 8,296,056 B2 | 10/2012 | Becker et al. |
| 8,386,171 B2 | 2/2013 | Park |
| 8,560,218 B1 | 10/2013 | Kahn et al. |
| 8,633,853 B2 | 1/2014 | Amidi |
| 8,644,843 B2 | 2/2014 | Canon et al. |
| 8,688,375 B2 | 4/2014 | Funk et al. |
| 8,725,404 B2 | 5/2014 | Kmiecik et al. |
| 8,825,397 B2 | 9/2014 | Kasargod et al. |
| 8,942,725 B2 | 1/2015 | Marti et al. |
| 8,949,020 B2 | 2/2015 | Lee |
| 9,026,263 B2 | 5/2015 | Hoshizaki |
| 9,047,668 B2 | 6/2015 | Haas et al. |
| 9,064,352 B2 | 6/2015 | Halder et al. |
| 9,140,567 B2 | 9/2015 | Fryer et al. |
| 9,234,760 B2 | 1/2016 | Deluca |
| 9,297,882 B1 | 3/2016 | Bhatia |
| 9,497,443 B1 | 11/2016 | Sundheimer et al. |
| 9,568,611 B2 | 2/2017 | Cosatto et al. |
| 9,727,793 B2 | 8/2017 | Heisele et al. |
| 9,749,780 B2 | 8/2017 | Huang et al. |
| 9,778,061 B2 | 10/2017 | Averbuch |
| 9,835,460 B2 | 12/2017 | Dong et al. |
| 9,897,454 B2 | 2/2018 | Shikimachi |
| 9,932,111 B2 | 4/2018 | Spinelli |
| 9,933,523 B2 | 4/2018 | Fitzgerald et al. |
| 9,975,632 B2 | 5/2018 | Alegria |
| 10,031,526 B1 | 7/2018 | Li et al. |
| 10,036,636 B2 | 7/2018 | Haglund et al. |
| 10,151,839 B2 | 12/2018 | McPeek |
| 10,204,459 B1 | 2/2019 | Martin et al. |
| 10,317,897 B1 | 6/2019 | Kentley-Klay et al. |
| 10,325,411 B1 | 6/2019 | Laney et al. |
| 10,373,003 B2 | 8/2019 | Liu et al. |
| 10,386,202 B2 | 8/2019 | Aucoin et al. |
| 10,415,984 B2 | 9/2019 | Cai et al. |
| 10,436,589 B2 | 10/2019 | Dong et al. |
| 10,533,862 B1 | 1/2020 | Paranjpe et al. |
| 10,571,270 B2 | 2/2020 | Hakim et al. |
| 10,584,971 B1 | 3/2020 | Askeland |
| 10,621,452 B2 * | 4/2020 | Efland .................. G05D 1/0088 |
| 10,649,469 B2 | 5/2020 | Salas-Moreno et al. |
| 10,655,973 B2 | 5/2020 | Khasis |
| 10,739,152 B2 | 8/2020 | Fryer |
| 10,816,654 B2 | 10/2020 | Rohani et al. |
| 10,832,502 B2 | 11/2020 | Levinson et al. |
| 10,863,166 B2 | 12/2020 | Jung et al. |
| 10,869,432 B2 | 12/2020 | Wykman et al. |
| 10,873,832 B2 | 12/2020 | Li et al. |
| 10,878,282 B2 | 12/2020 | Mei et al. |
| 10,891,497 B2 | 1/2021 | Cox et al. |
| 10,907,976 B2 | 2/2021 | Jiao et al. |
| 10,962,371 B2 | 3/2021 | Bush et al. |
| 10,983,530 B2 | 4/2021 | Sarkar et al. |
| 11,002,669 B2 | 5/2021 | Wetzel et al. |
| 11,009,356 B2 | 5/2021 | Wang et al. |
| 11,019,280 B2 | 5/2021 | Zhao et al. |
| 11,034,349 B2 | 6/2021 | Hyun |
| 11,046,308 B2 | 6/2021 | Hehn et al. |
| 11,079,235 B2 | 8/2021 | Choudhury et al. |
| 11,118,914 B2 | 9/2021 | Koponen et al. |
| 11,168,988 B2 | 11/2021 | Lingard et al. |
| 11,168,989 B2 | 11/2021 | Fowe |
| 11,221,220 B2 | 1/2022 | Keene |
| 11,313,684 B2 | 4/2022 | Chiu et al. |
| 11,340,632 B2 | 5/2022 | Zlot et al. |
| 11,415,706 B2 | 8/2022 | Regikumar et al. |
| 11,513,526 B2 | 11/2022 | Appelman et al. |
| 11,543,832 B2 | 1/2023 | Baldwin |
| 11,573,095 B2 | 2/2023 | Liu et al. |
| 11,578,982 B2 | 2/2023 | Milici |
| 11,614,340 B2 | 3/2023 | Kim et al. |
| 11,689,912 B2 | 6/2023 | Nair et al. |
| 11,709,262 B2 | 7/2023 | Fischell et al. |
| 2006/0244830 A1 | 11/2006 | Davenport et al. |
| 2008/0027639 A1 | 1/2008 | Tryon |
| 2009/0303120 A1 | 12/2009 | Alizadeh-Shabdiz |
| 2012/0262800 A1 * | 10/2012 | Eguchi .......... G02B 15/144113 |
| | | 359/687 |
| 2013/0085666 A1 | 4/2013 | Zhang et al. |
| 2015/0133146 A1 | 5/2015 | Mcclendon |
| 2015/0346349 A1 | 12/2015 | Taylor, Jr. et al. |
| 2016/0097861 A1 | 4/2016 | Li et al. |
| 2016/0146616 A1 | 5/2016 | Ren |
| 2017/0031032 A1 | 2/2017 | Garin et al. |
| 2017/0102467 A1 * | 4/2017 | Nielsen .................. G01S 19/47 |
| 2017/0151070 A1 | 6/2017 | Sun et al. |
| 2018/0025412 A1 | 1/2018 | Chaubard et al. |
| 2018/0043211 A1 | 2/2018 | Mohrman et al. |
| 2018/0306930 A1 | 10/2018 | Laine et al. |
| 2019/0080335 A1 | 3/2019 | Degeneffe et al. |
| 2019/0164418 A1 | 5/2019 | Neukart et al. |
| 2019/0287307 A1 | 9/2019 | Rogers et al. |
| 2019/0339083 A1 * | 11/2019 | Ewert .................... G01C 21/30 |
| 2020/0056904 A1 | 2/2020 | Han et al. |
| 2020/0348136 A1 | 11/2020 | Jain et al. |
| 2021/0020073 A1 | 1/2021 | Asmari et al. |
| 2021/0165107 A1 * | 6/2021 | Regikumar .......... G01S 19/393 |
| 2021/0262800 A1 | 8/2021 | Levine et al. |
| 2021/0405213 A1 | 12/2021 | Tuck et al. |
| 2022/0155402 A1 | 5/2022 | Nawaz et al. |
| 2022/0161818 A1 | 5/2022 | Solmaz et al. |
| 2022/0299341 A1 | 9/2022 | Zhang |
| 2022/0373339 A1 | 11/2022 | Xu et al. |
| 2023/0060793 A1 | 3/2023 | Wang et al. |
| 2023/0143872 A1 * | 5/2023 | Donham ................ G01S 19/47 |
| | | 701/472 |
| 2023/0162111 A1 | 5/2023 | Menipaz et al. |
| 2023/0177545 A1 | 6/2023 | Tubilla et al. |
| 2023/0194733 A1 | 6/2023 | Schlenter et al. |

OTHER PUBLICATIONS

Mok, E., et al., "Investigation of Seamless Indoor and Outdoor Positioning Integrating WiFi and GNSS", Shaping the Change XXIII Fig Congress, Munich, Germany, Oct. 8-13, 2006, 15 pages.

Retscher, G., "Mobile Multi-sensor Systems for Personal Navigation and Location-based Services", Geowissenschaftliche Mitteilungen, 2007, vol. 81, 120 pages.

Mok, E., et al., "Location determination using WiFi fingerprinting versus WiFi trilateration", Journal of Location Based Services, Jun. 2007, 1(2):145-159.

Kjaergaard, M.B, "A Taxonomy for Radio Location Fingerprinting", Conference Paper, Sep. 2007, 19 pages.

Bejuri, W., et al., "Ubiquitous Positioning: a Taxonomy for Location Determination on Mobile Navigation System", Signal & Image Processing: An International Journal (SIPIJ), Mar. 2011, 2(1):24-34.

Oshin, T.O., et al., "A Method to Evaluate the Energy-Efficiency of Wide-Area Location Determination Techniques Used by Smartphones", IEEE/IFIP EUC 2012, Paphos, Cyprus, Dec. 7, 2012, 9 pages.

The Charles Stark Draper Laboratory, Inc., "Samwise—How can autonomous vehicles navigate unknown environments without relying on GPS?", 2018, <https://www.draper.com/explore-solutions/samwise>, 2 pages.

Leonardo DRS, Inc., "A-PNT Converged Computer-Embedded and Scalable (AC2ES)" Datasheet, 2019, 3 pages.

Breaking Media, Inc., "Army developing software to let PNT sensors talk to each other", Nov. 8, 2021, <https://breakingdefense.com/2021/11/army-developing-software-to-let-pnt-sensors-talk-to-each-other/>, 2 pages.

War Blog, "Assured-PNT for all 160,000 tactical vehicles is now a reality", Nov. 18, 2021, <https://warblog.org/military/assured-pnt-for-all-160000-tactical-vehicles-is-now-a-reality/>, 5 pages.

\* cited by examiner

METHOD, APPARATUS, AND COMPUTER READABLE MEDIUM FOR CALCULATING A HANDRAIL INFLUENCE INTENSITY FACTOR

BACKGROUND

GPS systems are ubiquitous. Most people carry GPS receivers everywhere they go in their mobile phones and use their GPS-equipped phones for localization and navigation. Drivers rely on GPS navigation for direction and mapping to their destination. Critical infrastructure, such as commercial trucking and shipping, relies on GPS navigation to keep worldwide supply chains on track. The US government built and now operates the GPS system, and military forces rely on having accurate location and navigation data.

GPS has become the foundation of sophisticated systems designed to provide sometimes more accurate, useful, and predictive data. For example, GPS and accelerometers provide information to fitness trackers. Autonomous vehicle systems combine GPS data with data from various sensors, such as cameras, RADAR, LIDAR, and inertial measurement units (IMUs) to know their location, bearing, speed and to respond to the surrounding environment. Extensive resources have been expended over the past decades to build on and improve GPS.

Because of their reliance on GPS, such systems suffer accuracy and reliability degradation when they receive insufficient data from the GPS constellation. Interference devices can block GPS altogether, and even known GPS systems using secondary sensors for reckoning suffer unacceptable amounts of drift. Known solutions to drift influence a location of the vehicle on a computer-readable map, often by snapping the location from a first location to a second location. However, this solution fails to correct the root cause of the drift related to the accuracy and reliability degradation of GPS and other vehicle sensor data used to determine a vehicle heading. While correcting the location on the map produces a more accurate location reading, failure to correct the underlying sensor readings means that subsequent measurements from those sensors will be similarly erroneous and require correction of any drift.

There therefore exists a need for a solution to correcting drift that addresses the underlying sensor readings not only for the current location but for locations at future points in time.

SUMMARY

Exemplary embodiments described herein have innovative features, no single one of which is indispensable or solely responsible for their desirable attributes. Without limiting the scope of the claims, some of the advantageous features will now be summarized.

According to one aspect, a method for dynamically computing a handrail influence intensity factor comprises the steps of identifying, by a computing device, a current location of a vehicle, wherein the current location is determined from one of current GPS data and a last known location of the vehicle, retrieving, by the computing device, map data of an area corresponding to the current location of the vehicle, the map data comprising topographical and transportation information about the area, identifying, by the computing device, a current road of the vehicle based on the map data and the current location of the vehicle, determining, by the computing device and from the map data, at least one of one or more roads that intersect the current road and one or more roads closest to the current road, retrieving, by the computing device, a vehicle heading for the vehicle, determining, by the computing device, a set of candidate roads from the at least one of one or more roads that intersect the current road and one or more roads closest to the current road, determining, by the computing device, a relative target heading for each candidate road in the set of candidate roads, and calculating, by the computing device, a handrail influence intensity factor based on a distance between the current location of the vehicle and a closest point on each candidate road and based on a difference between the vehicle heading and the relative target heading for each candidate road.

According to one aspect, determining a set of candidate roads from the at least one of one or more roads that intersect the current road and one or more roads closest to the current road comprises the steps of identifying, by the computing device, the closest point between the current location of the vehicle and each of the at least one of one or more roads that intersect the current road and one or more roads closest to the current road, determining, by the computing device, that the closest point is below first threshold distance, calculating, by the computing device, a road heading for each road with a closest point below the first threshold distance, and determining, by the computing device, that a difference between the road heading and the vehicle heading is below a threshold value.

According to one aspect, the threshold value is variable and configured to be lower in an area with a high number of roads and higher in an area with a low number of roads.

According to one aspect, the method further comprises the step of converting all multi-line strings into single-line strings after retrieving the map data.

According to one aspect, the map data comprises one or more geojson files.

According to one aspect, the vehicle heading is determined from a digital magnetic compass, a doppler sensor, an inertial navigation sensor, and an inertial measurement unit onboard the vehicle.

According to one aspect, a system comprising one or more processors and one or more memories operatively coupled to at least one of the one or more processors and having instructions stored thereon that, when executed by at least one of the one or more processors, cause at least one of the one or more processors to execute the steps of the method described above.

According to one aspect, at least one non-transitory computer-readable medium storing computer-readable instructions that, when executed by at least one of one or more computing devices, cause at least one of the one or more computing devices to execute the steps of the method described above.

DETAILED DESCRIPTION

The present invention relates to a handrailing hardware system the provides improved localization and navigation in environments where GPS systems may be compromised, unreliable, or unavailable. Embodiments may implement improved methods for correcting drift of a vehicle location on a computer-readable map caused by inaccurate sensor readings for an extensible set of sensors. Embodiments may rely on a vehicle's known location and heading and the nearby features of the vehicle in its environment to determine whether a vehicle heading is correct or if it requires correction for drift.

Figure 1:
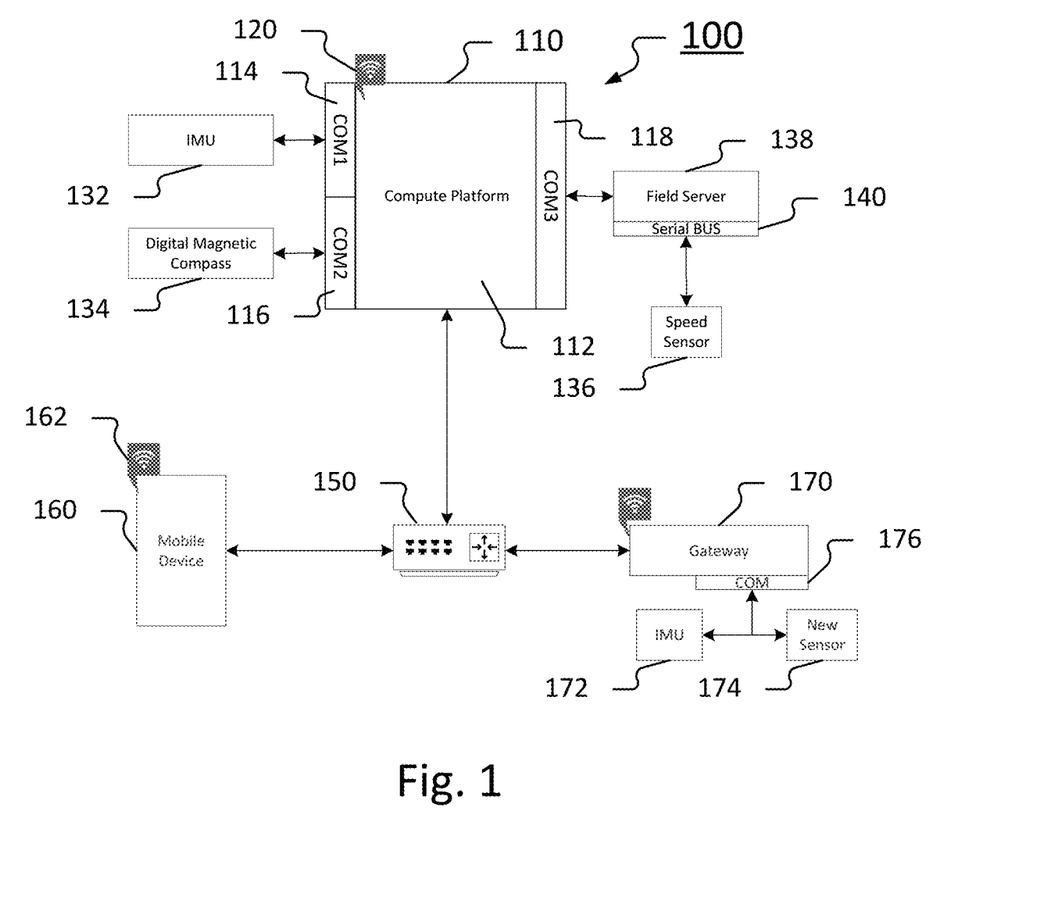
FIG. 1 illustrates a handrailing hardware system 100 implementing an exemplary embodiment.

FIG. 1 illustrates a handrailing hardware system 100 implementing an exemplary embodiment. For example, system 100 may be a communication system implemented within a vehicle. Hardware system 100 may include a handrailing server 110 configured to receive data from multiple sensors and process the data as disclosed herein. Handrailing server 110 includes a compute platform 112. The compute platform 112 may, for example, be an off the shelf tactical computing system including a processor, memory, a communication bus, interfaces, and an operating system. For example, the processing component may include an x64 central processing unit and run a Microsoft Windows operating system, such as Windows 10. Handrailing server 110 also includes multiple communication interfaces 114, 116, 118, and 120 configured to communicate with plurality of sensors. The communication interfaces may be a combination of wired and wireless communication interfaces, such as wired communication interfaces 114, 116, and 118 and wireless communication interface 120. Communication interfaces 114, 116, and 118 may, for example, comprise one or more USB, serial, or Ethernet (e.g., RJ45) ports configured to communicate with sensors. Communication interface 120 may be a wireless interface comprising one or more Wi-Fi (IEEE 802.11), Bluetooth, near-field communication ("NFC") or other wireless communication interfaces configured to communicate with sensors. Embodiments may also include a wired network interface, for example an RJ45 interface, for wired communication over a network. While the handrailing server 110 is shown with communication interfaces 114, 116, 118, and 120, alternative embodiments may include more or different communication interfaces. Specifically, exemplary embodiments may include multiple wireless communication interfaces 120 to facilitate communication with sensors and communication with mobile devices for displaying localization and navigation information and providing a user interface to interact with handrailing server 110.

The memory may be a non-transitory computer-readable storage medium storing instructions thereon, the instructions being executable by one or more processing components, e.g., the processor, to operate the vehicle and/or one or more of the components of system 100. The instructions may further be configured to, when executed by one or more processing components, perform the various methods, features, and/or functionality described in this disclosure.

The sensors attached for processing may include an IMU 132 communicatively coupled with communication interface 114, a digital magnetic compass ("DMC") 134 communicatively coupled to communication interface 116, and a speed sensor 136, such as the GMH Engineering Delta DRS1000 non-contact Doppler radar speed sensor, communicatively coupled to a field server 138 via a serial bus 140 (e.g., an RS-485 connection). While exemplary hardware system 100 shows IMU 132 and DMC 134 directly connected to communication ports of computing device 110, it is understood that those devices may be connected directly or via one or more intervening device, for example to facilitate protocol translation or interface compatibility. Similarly, while speed sensor 136 is shown coupled to communication interface 118 via field server 138 and via a serial bus 140, in alternative embodiments the sensor may interface directly with a communication interface of handrailing server 110. In alternative embodiments, the handrailing server 110 may have additional communication interfaces and may communicate with additional or different sensors. Additionally, while the exemplary embodiment depicts the capability of bidirectional communication with sensors, embodiments may include sensors utilizing unidirectional communication, such as Doppler.

Compute platform 112 may communicate with a networking device 150 via communication interface 120, for example via wireless communication. Networking device 150 may provide network switching or routing functions to enable communication between multiple devices. For example, one or more mobile device 160 may communicate via a communication interface 162 with the handrailing server 110 via networking device 150. The mobile device 160 may be, for example, a mobile phone or tablet using the Android operating system. In alternative embodiments, networking device 150 may provide communication via wired communication interfaces. In other embodiments, communication interface 120 of handrailing server 110 may be able to directly communicate with communication interface 162 of mobile device 160, for example via a direct wireless communication channel. Mobile device 150 may also provide sensor data to the handrailing server 110, for example via internal GPS, accelerometer, and digital gyroscope sensors.

One or more network-based gateway 170 may additionally communicate with handrailing server 110 via networking device 150 (or via a direct network connection). The gateway 170 may comprise, for example, a Raspberry Pi or Arduino microcontroller configured to facilitate networked communication between the multisource reckoning server 110 and one or more additional sensors, such as an IMU 172 or a new sensor 174 connected through a communication interface 176. New sensor 174 may be any type of sensor having an interface capable of communicating with the network-based gateway 170.

In some embodiments, the handrailing server 110 and components with wired connections may be housed in a protective case to enable portable deployment, for example in military or commercial vehicles or crafts. Gateway 170 and connected sensors may comprise various vehicle-mounted sensors.

The handrailing server 110 is designed to be agnostic to both the type of sensor (e.g., compass, speed sensor, accelerometer, etc.) and the technical design of the sensor (e.g., data format, communications protocol, etc.). By allowing for all sensor types and designs, the system can be augmented with new sensors for increasing complexity and accuracy, and to be robust against technical changes over time. To provide this functionality, it includes a purpose-built communications architecture to collect data from each sensor and store the sensor data in a common database. Accordingly, the handrailing server includes a hybrid virtualization and containerization structure. A virtual machine, such as a 64-bit Windows-based virtual machine, and a variety of Docker containers execute on the compute platform 112 to communicate with, collect data from, and standardize formats for each connected sensor. The containerization of each sensor's micro-service allows for custom, on-demand development, maintenance, and management for each sensor. The compute platform 112 thus can receive and normalize data from each sensor's unique data transmission format. By maintaining each sensor's data in its own container, the handrailing server is scalable and extensible as sensors are added or changed. Accordingly, while the handrailing hardware system 100 includes exemplary sensors as shown, alternative or additional sensors may be utilized by the system, such as GPS, digital gyroscopes, fiber optic gyroscopes, barometers, cameras, digital altimeters, pitot tubes, transducers, LIDAR, and wheel encoders.

Handrailing server 110 may pull the data from each sensor into its respective container in either a batch, micro-batch, or streaming process. The virtual machine coordinates with each container to standardize time and pull data at a requested interval. In alternative embodiments, the virtual machine may control and pull data from the sensors directly, however, in the preferred embodiment, control and management of the sensors is decoupled from the virtual machine, and moved to each sensor's container, to allow for the sensor containers to pull data at an independent rate, such as the maximum rate for each sensor, while the virtual machine dynamically pulls data at rates optimized for its location derivation processing. The containerized structure maximizes efficiency of pulling data from the sensors, while allowing the virtual machine to handle a broader set of tasks agnostic to specific sensor data formats and protocols, including pulling the data, optimizing the process that determines which data to pull, orchestrating time management across the variety of sensor data feeds, and storing those data in a common database to be used by an artificial intelligence engine, discussed below. This architecture reduces complexity and mitigates the performance implications of managing a plurality of sensors directly from the virtual machine. The virtual machine executes codes that dynamically makes decisions about which data to pull from the containers and at which time. The decision is made based on real-time analysis of the sensor data feeds and overall performance of the handrailing system 100. When the data is collected, it is stored, for example by the virtual machine, in a common database that can be accessed by the location derivation processes discussed below.

Figure 2A:
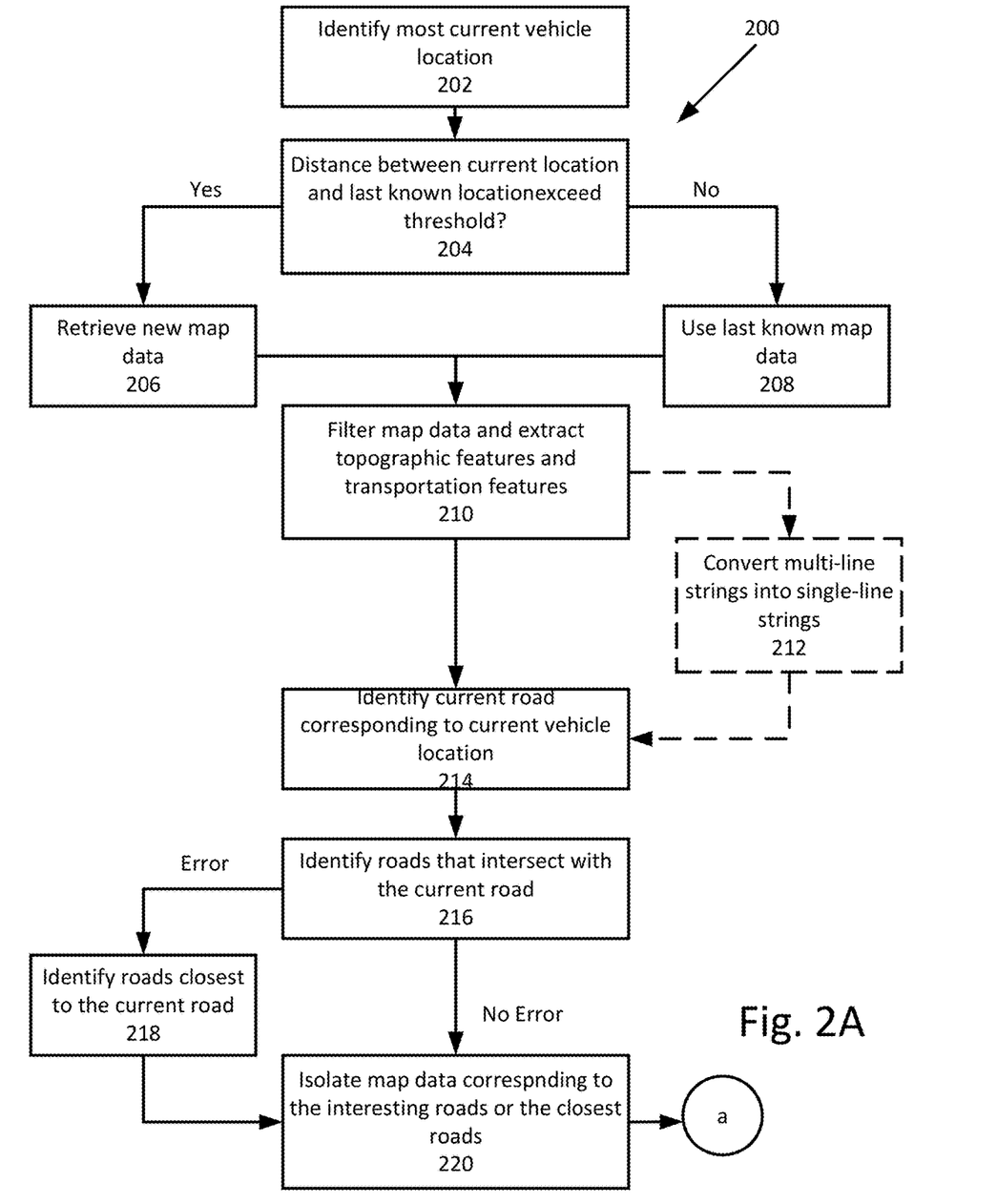
FIGS. 2A-2B illustrate a process flow 200 for calculating a handrail influence intensity factor according to an exemplary embodiment.

FIG. 2 illustrates a process flow 200 for correcting a GPS location by handrailing. At step 202 at an initial time (to), the system starts a process for identifying a most current location of a vehicle. It may do this first by determining if there is a trusted GPS reading. The system may check whether it has GPS online, for example checking whether the system is connected to a GPS receiver and that the GPS receiver is receiving signals from a constellation. If not, the system can attempt to bring a GPS subsystem online to read location information. If the GPS subsystem is already online, or it comes online without timing out, the system may start an automated reading process. As discussed above in the context of FIG. 1, the reading process may be containerized such that a GPS reading process communicates with a GPS subsystem and a handrailing system virtual machine may obtain GPS location information from the containerized GPS reading process.

If a GPS subsystem is unavailable or times out, the system can determine if there is a trusted previously known location in the database, e.g., a database on handrail server 110. If so, a database process can retrieve the previously known location. If there is not a trusted previously known location in the database, the system can perform a manual reading process. To perform a manual reading process, computer vision can be used to provide location data to the manual reading process. Alternatively or additionally, a user can select their location based on the location of other objects or terrain and the manual reading process can determine the user's location based on the user's input data in a database of terrain association data. For example, a user may look at a map showing terrain data and place a pin at their current location in relation to buildings, roads, or other terrain markers. Further, a user may, alternatively or additionally, manually input a location, for example on mobile device 160 by entering their latitude and longitude or by selecting a location on a computer-generated map using an I/O device connected to the mobile device and/or mobile device 160 itself (i.e., with a touch screen). A user can confirm the accuracy of a last known position, for example upon application startup.

Next, at step 204, the system determines whether a distance between the current location data of the vehicle and a last known location of the vehicle exceeds a threshold distance. If the distance between the current location data of the vehicle and the last known location of the vehicle exceeds the threshold distance, then the system proceeds to step 206. If the distance between the current location data of the vehicle and the last known location of the vehicle does not exceed the threshold distance, then the system proceeds to step 208. In embodiments in which a last known trusted location of the vehicle is the most current location data of the vehicle, the difference is zero and the system proceeds to step 208.

At step 206, the system retrieves new map data. Retrieving new map data can include downloading new map data from a tile database located on board the vehicle, e.g., on handrailing server 110. Alternatively, the new map data can be received from a remote tile server communicatively coupled to the vehicle. The new map data can be, for example and without limitation, in the form of a geojson file type that contains data about the geography and topography of an area on a map corresponding to the most current location of the vehicle identified in step 202. This can include, for example and without limitation, geographic and topographic information about topographical features in the area of a map corresponding to the most current location, such as hills, mountains, and lakes, and geographic and topographic information about man-made transportation in the area, such as roads, tunnels, bridges, on and off ramps, and buildings. The new map data may render a pre-defined area surrounding the current location of the vehicle. The new map may be circular in shape and fan out from the vehicle as the center at a pre-defined radius. Alternatively, the map may be any shape suitable to the needs of the system.

At step 208, the system uses the last known map data corresponding to the last known location. In such embodiments, because distance between the current location of the vehicle and the last-known location of the vehicle did not exceed the threshold value at step 204, the map data already known by the system corresponding to the last known location remains accurate to the current location of the vehicle. As with the new map data described with respect to step 206, this last known map data may be retrieved from a tile server located on board the vehicle, e.g., handrailing server 110, or from a remote tile server. The last known map data may also be in the form of a geojson file type and include the same types of data as discussed with respect to step 206.

Whether the system executed step 206 or 208, the system proceeds to execute step 210 of filtering the map data and extracting the geographic and topographic information about the topographical features and the transportation features contained therein. Filtering the map data and extracting the geographic and topographical information about the topographical and transportation features can include the system parsing the map data to identify these features and filtering out extraneous information. Extraneous information can include the names of stores, restaurants and other buildings, names of geographic features such as lakes and rivers, and other extraneous information not required by the system to calculate a handrail influence intensity factor.

Next, at step 212, the system can convert all multi-line strings from the map data into single-line strings. For example, in embodiments where the map data is a geojson file, each multi-line string representing a road can be converted to a single-line string. If the map data does not include any multi-line strings and only includes single-line strings, then the system can skip step 212 and proceed to step 214.

At step 214, the system identifies a current road of the vehicle corresponding to the current location data of the vehicle. Identifying the current road that the vehicle is on can include parsing the map data for a transportation feature corresponding to a road that matches the current location of the vehicle. The name of the current road may be retrieved from a database, such as a REDIS database, that can be located on handrailing server 110 on the vehicle or on a remote server. If the vehicle is not on a road, but is rather off-road, then identifying the current road that the vehicle is on can include parsing the topographical data of the map data to identify topographical features in the area that corresponds to the current location of the vehicle.

Next, at step 126, the system identifies roads that intersect with the current road. Identifying roads that intersect with the current road can include parsing the map data for single line-strings comprising one or more points that overlap one or more points of the single-line string corresponding to the current road of the vehicle. This can include comparing the single-line string corresponding to the current road with the single-line strings of other roads in the map data. Using a distance algorithm over the points thereof, any roads having a point at which the distance is zero are determined to intersect with the current road of the vehicle.

If the system fails to identify any roads that intersect with the current road, it returns an error and proceeds to execute step 218. In embodiments where the current road is a topographical feature and not a road, then the system can return an error where no other topographical features or transportation features intersect the current topographical feature. After executing step 218, the system proceeds to execute step 220.

If the system does not return an error, then the system proceeds to execute step 220. The system may not return an error where it successfully identifies one or more roads that intersect with the current road the vehicle is on.

At step 218, the system identifies roads closest to the current location of the vehicle. In some embodiments, a closeness radius around the current location of the vehicle may be pre-set and the system will identify all roads within that pre-defined radius as a road closest to the current location of the vehicle. In some embodiments, a user may select the closeness radius. In other embodiments, the closeness radius may be optimized based on the current location of the vehicle. For example, the system may define a small closeness radius where there is a large number of roads around the current location of the vehicle, such as in a city. Conversely, the system may define a large closeness radius where there are a lower number of roads around the current location of the vehicle, such as in a rural area. In this, the sensitivity of the system may be defined. In some embodiments, the value of N may be pre-set and the system will expand the distance at which it will identify a road as a road closest to the current location of the vehicle.

At step 220, the system isolates the map data corresponding to the one or more intersecting roads or the roads closest to the current road. This can include narrowing the map data to include the single-line strings corresponding to the current road and the one or more intersecting roads or the roads closest to the current vehicle location and ignoring other map data.

Figure 2B:
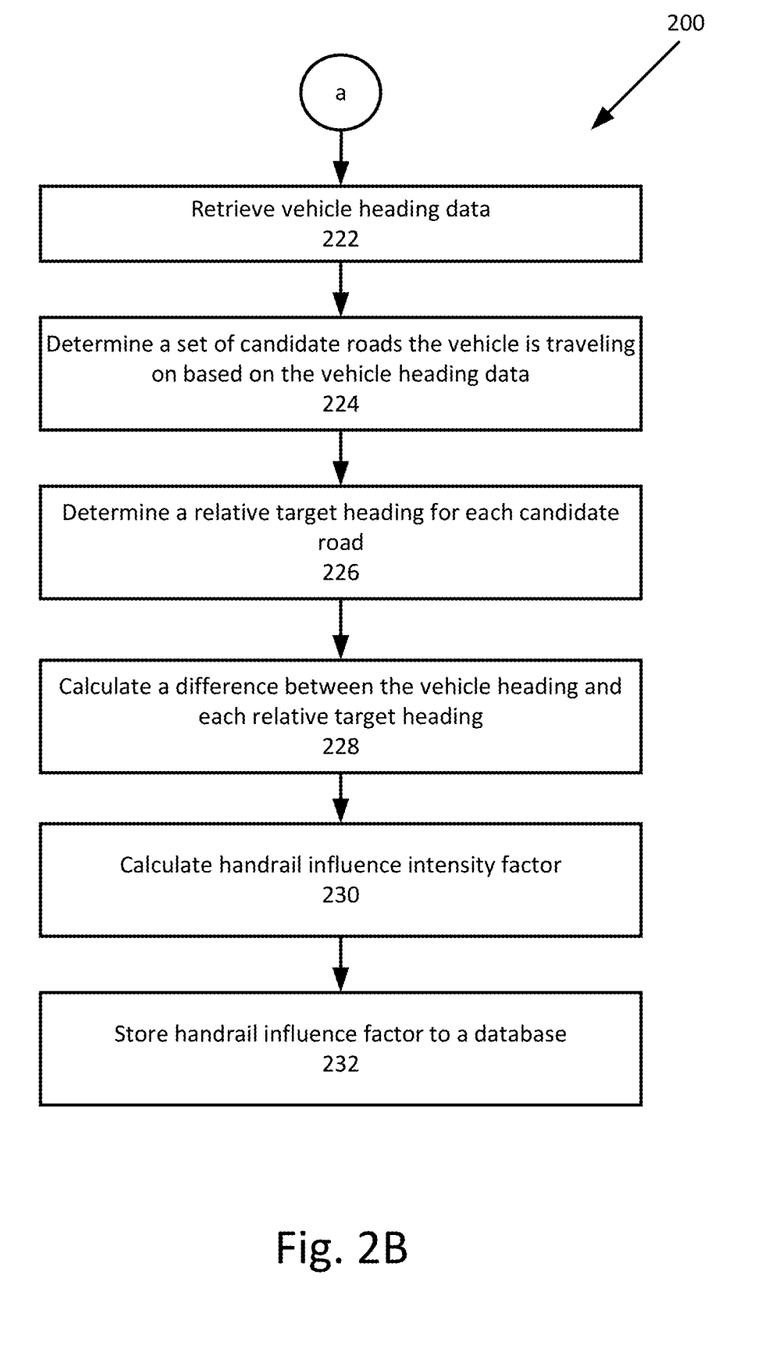

After step 220, the system proceeds to step 222, illustrated in FIG. 2B. At step 222, the system retrieves vehicle heading data for the vehicle. Vehicle heading data can be received from any one or more of a variety of compasses (e.g., rotation vector, magnetometer, digital magnetic compass, etc.). The heading data may also optionally include angular velocity or acceleration received from a gyroscope of IMU 132 to identify changes in direction and whether correction or weighting of sensor data is required. In some embodiments, the system can apply a heading consensus algorithm to the heading data, where the algorithm utilizes an artificial intelligence process to analyze the heading data. In some embodiments, the output of the heading consensus algorithm is used to compute a true heading of the vehicle.

Next, at step 224, the system determines a set of candidate roads from the roads intersecting the current road or the roads closest to the current location of the vehicle. The system can compare the vehicle heading data with the map data corresponding to the roads intersecting the current road or the roads closest to the current location of the vehicle. This can include determining whether the vehicle heading is consistent with the single-line string of the intersecting roads or the closest roads. For example, a road that interests or is close to the current road but that is not substantially parallel to the current road or otherwise follows a path that leads away from the current road is not likely to correspond to a road that the vehicle is traveling on. As such, a road whose path differs from the vehicle heading by more than a threshold value is less likely to be the road that the vehicle is traveling on than a road whose path differs by less than the threshold value.

Figure 3:
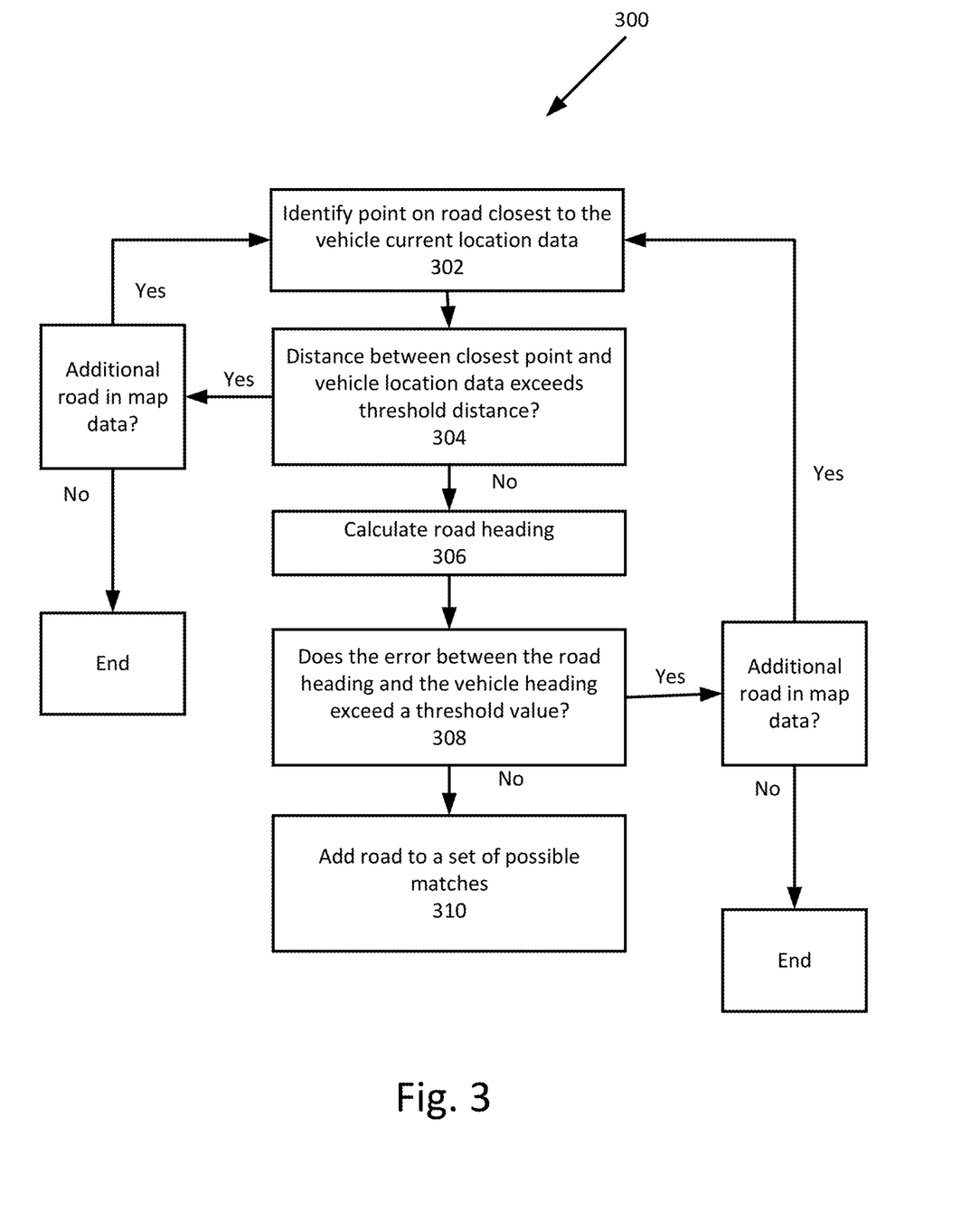
FIG. 3 illustrates a process flow 300 for determining a set of candidate roads for calculating a handrail influence intensity factor according to an exemplary embodiment.

FIG. 3 is a flow-chart illustrating a process 300 for determining a set of candidate roads from the roads that intersect the current roads or the roads closest to the current location of the vehicle according to an exemplary embodiment. First, at step 302, the system identifies a point on a first road that is closest to the current location of the vehicle. The system can compare the location data of the current location of the vehicle with the location data of the first road to identify a point on the first road that is a minimum distance from the current location of the vehicle. In embodiments in which the map data is a geojson file, the system can calculate a difference between the coordinates of the current location of the vehicle and each coordinate point in the single-line string corresponding to the first road and select the point with the lowest difference. If more than one point have the same lowest difference, then the system can identify both points and proceed to step 304.

Next, at step 304, the system determines whether the distance between the current location of the vehicle and each closest point(s) of the first road exceeds a threshold value. If the distance exceeds a threshold value, then the first road is not a candidate road and the system ignores that road.

Because the distance between the first road and the current vehicle location exceeds the threshold value, the likelihood that that the vehicle is traveling on that road is low and that road can be ignored by the system as a possible candidate road. The system then determines whether there are any additional roads in the map data corresponding to the roads that interest the current road of the vehicle or the roads closest to the current vehicle location. If there is at least one additional road, then the system returns to step 302 and determines a point on that road closest to the current vehicle location. If there are no more roads in the map data corresponding to the roads that interest the current road of the vehicle or the roads closest to the current vehicle location, then the system ends the process for determining a set of candidate roads and returns to step 226. If the distance does not exceed the threshold value, then the system continues to step 306.

At step 306, the system calculates a road heading for the first road. The road heading can be determined from the map data corresponding to the first road.

Next, at step 308, the system determines whether a difference between the vehicle heading and the road heading of the first road exceeds a threshold value. If the difference exceeds the threshold, then the system ignores that road as a potential candidate road. The greater the difference between the vehicle heading and the road heading, the less likely that the vehicle is traveling on the first road. In this way, a user may define the sensitivity of the system by setting the threshold value. For a more sensitive system, the threshold will be low, requiring the vehicle heading and the road heading to be closer to select the first road as a candidate road. This may be a preferred configuration where there are a high number of roads in the area of the current location of the vehicle. Alternatively, for a less sensitive system, the threshold can be higher, allowing the system to select candidate roads whose headings differ more significantly from the vehicle heading. In some embodiments, the threshold value may be 15 degrees, meaning that the system will only select candidate roads whose road heading is less than 15 degrees different than the vehicle heading.

If the difference between the vehicle heading and the road heading exceeds the threshold value, the system then determines whether there are any additional roads in the map data corresponding to the roads that interest the current road of the vehicle or the roads closest to the current vehicle location. If there is at least one additional road, then the system returns to step 302 and determines a point on that road closest to the current vehicle location. If there are no more roads in the map data corresponding to the roads that interest the current road of the vehicle or the roads closest to the current vehicle location, then the system ends the process for determining a set of candidate roads and returns to step 226. If the process 300 returns no candidate roads, then a handrail influence intensity factor is disabled.

Returning to FIG. 2B, now that the system has determined a set of candidate roads, the system proceeds to step 226 and determines a relative target heading for each candidate road. To determine the relative target heading of each candidate road, the system calculates a heading measured from the current location of the vehicle to the closest point of a respective candidate road.

Next, at step 228, the system calculates a difference between the vehicle heading and the relative target heading for each candidate road.

After determining this difference for each candidate road, the system performs step 230 and calculates a handrail influence intensity factor based on the differences between the vehicle heading and the relative target heading of each candidate road and the distances between the current location of the vehicle and the closest point on each candidate road. The handrail intensity factor represents an adjustment to the vehicle's current heading as determined from the vehicle heading data to account for drift resulting from poor calibration of the vehicle sensors used to determine the vehicle heading, interference with the vehicle sensors that can be caused by the vehicle itself, the positioning of a vehicle sensor on the vehicle, and other external effects, and external factors, such as loss of GPS connection. This handrail influence intensity factor addresses the drift caused by inaccuracies in the sensor data used to determine the vehicle heading and is applied to future sensor readings, resulting in more accurate sensor readings at later times.

A small difference between the vehicle heading and the relative target heading indicates that the vehicle may be heading on the candidate road. However, when the distance between the current vehicle location and the closest point on a respective candidate road is large, then the small difference in vehicle heading and relative target heading is less indicative of an inaccurate vehicle heading because there is a lower likelihood that the vehicle is in fact traveling on the candidate road. Similarly, if the distance between the vehicle location and the closest point on the candidate road is small, but the difference between the vehicle heading and the relative target heading is large, then the small distance is less indicative of an inaccurate vehicle heading because the headings are inconsistent with each other. Further, if both the distance between the current vehicle location and the closest point of the candidate road and the difference between the vehicle heading and the relative target heading are large, then there is a lower likelihood that the candidate road is the actual road that the vehicle is traveling on. In all three of these scenarios, the handrail influence intensity factor is low and does not influence the vehicle heading much.

In contrast, if both the distance between the current vehicle location and the closest point of the candidate road and the difference between the vehicle heading and the relative target heading are small, then there is a higher likelihood that the candidate road is the actual road that the vehicle is traveling on. In such instances, the handrail influence intensity factor is larger and will influence the vehicle heading more to correct for drift experienced by the system.

In some embodiments, the system can calculate a handrail intensity factor using all of the candidate roads or using a portion of the candidate roads. In embodiments in which only a portion of the candidate roads are used, the system can sort the candidate roads in order of distance between the current location of the vehicle and the closest point on the candidate road and choose a portion of the candidate roads with the lowest distances between the current location of the vehicle and the closest point on the candidate road. In some embodiments, the portion of candidate roads may be defined as those having a closest point within a threshold distance of the current location of the vehicle.

At step 232, the system stores the handrail influence intensity factor in a database. This can include storing the handrail influence intensity factor in a database on the vehicle, e.g., handrail server 110, or storing the handrail influence intensity factor in a database on a remote computing device or server. In some embodiments, the handrail influence intensity factor may be used in a dead reckoning method, such as that described in U.S. Pat. No. 11,506,797, the entirety of which is incorporated by reference herein.

Figure 4:
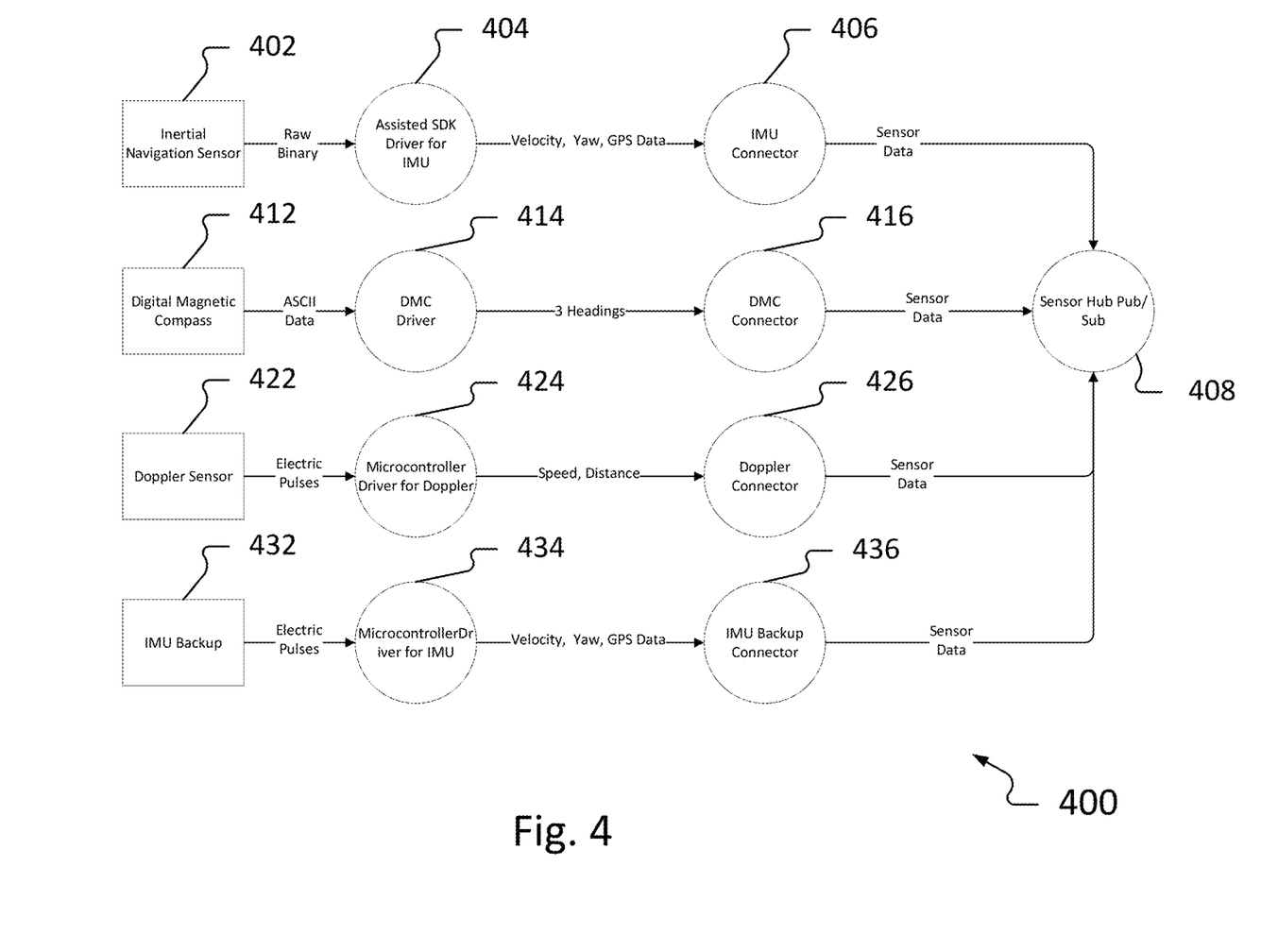
FIG. 4 illustrates a data flow 400 for deploying a handrailing system in a vehicle.

FIG. 4 illustrates a data flow 400 for deploying a handrail influence system in a vehicle. As shown, the exemplary in-vehicle deployment may utilize an inertial navigation sensor 402, a digital magnetic compass 412, a Doppler sensor 422, and an IMU backup 432. Those sensors or sensor suites may be deployed in the vehicle in a portable manner, such as integrated into a device housing a multi-source reckoning system server, or may be independently vehicle mounted or integrated and communicatively coupled to a multi-source reckoning system server. At 402, the inertial navigation sensor (e.g., an IMU) may send raw binary data to an assisted software development kit driver 404. At 404, the driver may translate and process the raw IMU data to provide velocity, yaw (i.e., bearing or twist about a vertical axis), and GPS data to an IMU connector 406 for consumption by a sensor hub 408. At 412, the DMC may send raw ASCII data to a DMC driver 414. At 414, the DMC driver may translate and process the raw ASCII data into heading/yaw, roll, and pitch information (i.e., 3 angular headings) to a DMC connector 416 for consumption by sensor hub 408. At 422, the Doppler sensor may transmit raw binary to a microcontroller driver for Doppler 424, which may process and transform the Doppler sensor data into speed and distance data and provide the data to a Doppler connector 426 for consumption by sensor hub 408. At 532, the IMU may send raw binary data to a microcontroller driver for the IMU 434, which may process and translate the sensor data into velocity, yaw, and GPS data for an IMU backup connector 436, which may provide the data downstream to the sensor hub 408. The IMU backup may provide additional data to improve module training and cancel error in derived location determinations. Alternatively, the IMU backup may provide a true backup and be utilized by the system only if the primary IMU goes offline or suffers degradation.

Figure 5:
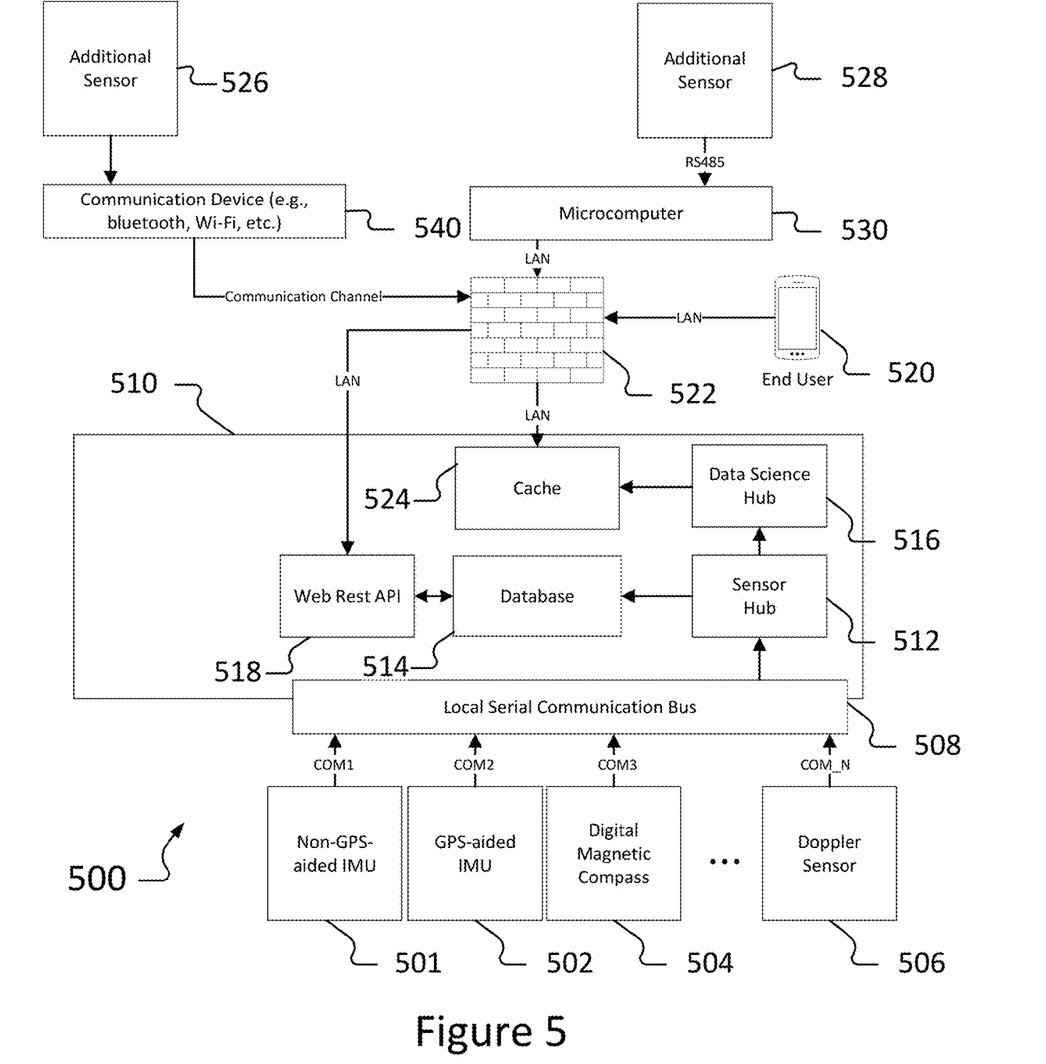
FIG. 5 illustrates a deployment architecture 500 for a handrailing system.

FIG. 6 illustrates an exemplary deployment architecture for a handrail influence system 500. As shown, the system includes multiple sensors, including non-GPS-aided IMU 501, IMU 502, DMC 504, and Doppler sensor 506, each operatively coupled to a local serial communication bus 508. As shown, the system may include additional sensors operatively coupled to the local serial communication bus 508. Components of the handrail influence system 500 may be deployed in a secure container 510, such as a Pelican container, with wired and/or wireless communication and network interfaces to communicate with sensors and a user interface device. The local serial communication bus 508 provides sensor data to sensor hub 512, which provides processed data to both a database 514 for storing sensor data and a data science hub 516. A web rest API 518 provides an interface for an end user device 520 to request data from the database 514, for example over a wireless local area network ("LAN") connection through a firewall 522. Data science hub 516 provides a cache of MDL data 524 that may also be accessible to an end user device 520 over a LAN (or through web rest API 518).

Handrail influence system 500 may also include one or more additional sensor(s) 528 connected via serial connections to a microcomputer 530, such as a Raspberry Pi or Arduino device. Microcomputer 530 is configured to interface with the additional sensor(s) 528, receive sensor data, and send the data over a LAN connection to the web rest API 518 for storage in database 514. For example, microcomputer 530 may be utilized to operatively couple sensors installed in a vehicle to the handrail influence system 500.

Handrail influence system 500 may further include one or more additional sensor 526 connected via a communication channel to device 540. Communication device 540 may be configured to interface with the additional one or more sensor 526, receive sensor data, and send data over a communication channel, such as a Bluetooth or Wi-Fi channel, to the web rest API for storage in database 514. Optionally, communication device 540 may also provide a communication channel for another handrail influence system to communicate with handrail influence system 500 to share one or more of sensor data and derived location data.

While the above detailed description has shown, described, and pointed out novel features of the disclosure as applied to various exemplary embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations may be understood and effected by those skilled in the art in practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open-ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, un-recited elements or method steps; the term "having" should be interpreted as "having at least"; the term "such as" should be interpreted as "such as, without limitation"; the term "includes" should be interpreted as "includes but is not limited to"; the term "example" or the abbreviation "e.g." is used to provide exemplary instances of the item in discussion, not an exhaustive or limiting list thereof, and should be interpreted as "example, but without limitation"; the term "illustration" is used to provide illustrative instances of the item in discussion, not an exhaustive or limiting list thereof, and should be interpreted as "illustration, but without limitation"; adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

We claim:

1. A method, executed by a computing device, for dynamically computing a handrail influence intensity factor and correcting a GPS location, the method comprising:
   receiving, by the computing device, GPS data from a GPS subsystem;
   identifying, by the computing device, a current location of a vehicle, wherein the current location is determined from one of current GPS data and a last known location of the vehicle;
   retrieving, by the computing device, map data of an area corresponding to the current location of the vehicle, the map data comprising topographical and transportation information about the area;
   identifying, by the computing device, a current road of the vehicle based on the map data and the current location of the vehicle;
   determining, by the computing device and from the map data, at least one of one or more roads that intersect the current road and one or more roads closest to the current road;
   retrieving, by the computing device, a vehicle heading for the vehicle;
   determining, by the computing device, a set of candidate roads from the at least one of one or more roads that intersect the current road and one or more roads closest to the current road;
   determining, by the computing device, a relative target heading for each candidate road in the set of candidate roads;
   calculating, by the computing device, a handrail influence intensity factor based on a distance between the current location of the vehicle and a closest point on each candidate road and based on a difference between the vehicle heading and the relative target heading for each candidate road;
   storing, by the computing device, the handrail influence intensity factor in a database;
   adjusting, by the computing device, the vehicle heading based on the handrail influence intensity factor; and
   correcting, by the computing device, the GPS location using dead reckoning and the adjusted vehicle heading.

2. The method of claim 1, wherein determining a set of candidate roads from the at least one of one or more roads that intersect the current road and one or more roads closest to the current road comprises:
   identifying, by the computing device, the closest point between the current location of the vehicle and each of the at least one of one or more roads that intersect the current road and one or more roads closest to the current road;
   determining, by the computing device, that the closest point is below first threshold distance;
   calculating, by the computing device, a road heading for each road with a closest point below the first threshold distance; and
   determining, by the computing device, that a difference between the road heading and the vehicle heading is below a threshold value.

3. The method of claim 2, wherein the threshold value is variable and configured to be lower in an area with a high number of roads and higher in an area with a low number of roads.

4. The method of claim 1, further comprising:
   after retrieving the map data, converting all multi-line strings into single-line strings.

5. The method of claim 1, wherein the map data comprises one or more geojson files.

6. The method of claim 1, wherein the vehicle heading is determined from a digital magnetic compass, a doppler sensor, an inertial navigation sensor, and an inertial measurement unit onboard the vehicle.

7. The method of claim 1, wherein the computing device comprises a containerization structure,
   wherein the containerization structure includes a plurality of containers to communicate with a plurality of connected sensors, collect data from the plurality of connected sensors, and standardize formats of the collected data.

8. The method of claim 7, wherein the computing device comprises a virtual machine,
   wherein the virtual machine coordinates with the plurality of containers to standardize time and pull data at a requested interval.

9. A system for dynamically computing a handrail influence intensity factor and correcting a GPS location, the system comprising:
   one or more processors; and
   one or more memories operatively coupled to at least one of the one or more processors and having instructions stored thereon that, when executed by at least one of the one or more processors, cause at least one of the one or more processors to:
   receive GPS data from a GPS subsystem;
   identify a current location of a vehicle, wherein the current location is determined from one of current GPS data and a last known location of the vehicle;
   retrieve map data of an area corresponding to the current location of the vehicle, the map data comprising topographical and transportation information about the area;
   identify a current road of the vehicle based on the map data and the current location of the vehicle;
   determine from the map data at least one of one or more roads that intersect the current road and one or more roads closest to the current road;
   retrieve a vehicle heading for the vehicle;
   determine a set of candidate roads from the at least one of one or more roads that intersect the current road and one or more roads closest to the current road;
   determine a relative target heading for each candidate road in the set of candidate roads;

calculate a handrail influence intensity factor based on a distance between the current location of the vehicle and a closest point on each candidate road and based on a difference between the vehicle heading and the relative target heading for each candidate road;
store the handrail influence intensity factor in a database;
adjust the vehicle heading based on the handrail influence intensity factor; and
correct the GPS location using dead reckoning and the adjusted vehicle heading.

10. The system of claim 9, wherein the instruction that cause at least one of the one or more processors to determine a set of candidate roads from the at least one of one or more roads that intersect the current road and one or more roads closest to the current road further cause at least one of the one or more processors to:
identify the closest point between the current location of the vehicle and each of the at least one of one or more roads that intersect the current road and one or more roads closest to the current road;
determine that the closest point is below first threshold distance;
calculate a road heading for each road with a closest point below the first threshold distance; and
determine that a difference between the road heading and the vehicle heading is below a threshold value.

11. The system of claim 10, wherein the threshold value is variable and configured to be lower in an area with a high number of roads and higher in an area with a low number of roads.

12. The system of claim 9, wherein the instructions, when executed by at least one of the one or more processors, further cause at least one of the one or more processors to:
convert all multi-line strings into single-line strings after retrieving the map data.

13. The system of claim 9, wherein the map data comprises one or more geojson files.

14. The system of claim 9, wherein the vehicle heading is determined from a digital magnetic compass, a doppler sensor, an inertial navigation sensor, and an inertial measurement unit onboard the vehicle.

15. At least one non-transitory computer-readable medium storing computer-readable instructions that, when executed by at least one of one or more computing devices, cause at least one of the one or more computing devices to:
receive GPS data from a GPS subsystem;
identify a current location of a vehicle, wherein the current location is determined from one of current GPS data and a last known location of the vehicle;
retrieve map data of an area corresponding to the current location of the vehicle, the map data comprising topographical and transportation information about the area;
identify a current road of the vehicle based on the map data and the current location of the vehicle;
determine from the map data at least one of one or more roads that intersect the current road and one or more roads closest to the current road;
retrieve a vehicle heading for the vehicle;
determine a set of candidate roads from the at least one of one or more roads that intersect the current road and one or more roads closest to the current road;
determine a relative target heading for each candidate road in the set of candidate roads;
calculate a handrail influence intensity factor based on a distance between the current location of the vehicle and a closest point on each candidate road and based on a difference between the vehicle heading and the relative target heading for each candidate road;
store the handrail influence intensity factor in a database;
adjust the vehicle heading based on the handrail influence intensity factor; and
correct the GPS location using dead reckoning and the adjusted vehicle heading.

16. The at least one non-transitory computer-readable medium of claim 15, wherein the instruction that cause at least one of the one or more computing devices to determine a set of candidate roads from the at least one of one or more roads that intersect the current road and one or more roads closest to the current road further cause at least one of the one or more computing devices to:
identify the closest point between the current location of the vehicle and each of the at least one of one or more roads that intersect the current road and one or more roads closest to the current road;
determine that the closest point is below first threshold distance;
calculate a road heading for each road with a closest point below the first threshold distance; and
determine that a difference between the road heading and the vehicle heading is below a threshold value.

17. The at least one non-transitory computer-readable medium of claim 16, wherein the threshold value is variable and configured to be lower in an area with a high number of roads and higher in an area with a low number of roads.

18. The at least one non-transitory computer readable medium of claim 15, wherein the instructions, when executed by at least one of the one or more computing devices, further cause at least one of the one or more computing devices to:
convert all multi-line strings into single-line strings after retrieving the map data.

19. The at least one non-transitory computer readable medium of claim 15, wherein the map data comprises one or more geojson files.

20. The at least one non-transitory computer readable medium of claim 15, wherein the vehicle heading is determined from a digital magnetic compass, a doppler sensor, an inertial navigation sensor, and an inertial measurement unit onboard the vehicle.

* * * * *